United States Patent [19]
Grochowski

[11] Patent Number: 5,749,451
[45] Date of Patent: May 12, 1998

[54] CLUTCH ASSEMBLY WITH A PISTON STROKE ADJUSTER

[75] Inventor: Edwin Thomas Grochowski, Howell, Mich.

[73] Assignee: General Motors Corporation, Detroit, Mich.

[21] Appl. No.: 721,430

[22] Filed: Sep. 27, 1996

[51] Int. Cl.⁶ .................... F16D 13/75; F16D 25/0638
[52] U.S. Cl. .................... 192/70.25; 192/85 AA; 192/111 A; 188/71.8; 188/196 P
[58] Field of Search .............. 192/70.25, 85 AA, 192/111 A; 188/71.8, 196 P

[56] References Cited

U.S. PATENT DOCUMENTS

| | | | |
|---|---|---|---|
| 2,252,906 | 8/1941 | Williamson | 192/111 A X |
| 2,965,207 | 12/1960 | Snyder | 192/111 A |
| 3,371,753 | 3/1968 | Meier | 188/196 P X |
| 4,975,714 | 12/1990 | Goscenski, Jr. | 192/111 A X |

*Primary Examiner*—Richard M. Lorence
*Attorney, Agent, or Firm*—Donald F. Scherer

[57] ABSTRACT

A clutch assembly has a clearance between the piston and the clutch pack when the clutch is disengaged. This clearance is set and maintained by a one-way mechanism which establishes the limit of linear movement of the clutch piston during piston retraction or disengagement of the clutch.

4 Claims, 2 Drawing Sheets

CLUTCH ASSEMBLY WITH A PISTON STROKE ADJUSTER

TECHNICAL FIELD

This invention relates to clutch assemblies, and more particularly, to clutch assemblies having a predetermined maximum clearance between the piston and the clutch packs.

BACKGROUND OF THE INVENTION

Power transmissions, particularly multi-speed power transmissions of the automatic shifting type, utilize fluid operated friction devices each having a piston disposed in a housing to enforce the frictional engagement between interleaved disc elements formed in a friction pack alternately coupled with an input or output member. In some cases, the friction device is a brake and the output member is a stationary housing. The piston travels linearly in a cavity in a housing between a pressure set position (engaged) and a spring set position (disengaged). The amount of piston travel between these two positions is the clearance quite often termed the free running clearance.

During disengagement, the clearance permits the disc elements coupled with one member to be spaced from the disc elements coupled with the other member to thereby reduce the spin losses within the transmission. The clearance is also a determining factor during clutch engagement, since the piston must be pressurized and move through the clearance value or distance before torque transmission can begin. Thus, the engagement time is affected by the clearance. Since the disc members are subject to wear during the life of a transmission, the clearance changes slightly and shift times are affected.

Some of the more modern transmissions utilizing electronic controls incorporate adaptive measures to compensate for the adjusted engagement times found in the engagement devices. Other methods of compensating for the change in clearance in the friction devices is the utilization of a one-way clutch or brake which will carry the torque of the off-going device until the on-coming device has sufficient torque capacity. Another method of compensating these occurrences is the use of a "wash out" shift in which a band brake and a friction disc clutch are utilized to interchange from one speed ratio to another. In these situations, the pressure to apply to the clutch is also utilized to disengage the band. Thus, the band will maintain torque capacity until the clutch has sufficient pressure to carry the torque load as required.

SUMMARY OF THE INVENTION

The present invention maintains the clearance at a substantially constant value regardless of the friction pack wear. The piston is mounted on a one-way mechanism which permits unrestricted piston movement during the engagement process but restricts the movement to a predetermined value during disengagement. The predetermined value at which the piston moves during disengagement is equal to the clearance which is desired in the friction pack.

It is therefore the primary object of this invention to provide an improved fluid operated friction drive assembly for a power transmission wherein a predetermined clearance is provided during the disengagement of the friction device.

In one aspect of the invention, a piston interacts with a one-way mechanism to limit the retraction distance of the piston during disengagement.

In another aspect of the invention, a clutch piston and the one-way mechanism are incorporated in the clutch piston subassembly.

In a further aspect of the invention, the one-way mechanism and a return spring assembly comprise a subassembly of the piston assembly.

DESCRIPTION OF AN EXEMPLARY EMBODIMENT

Figure 1:
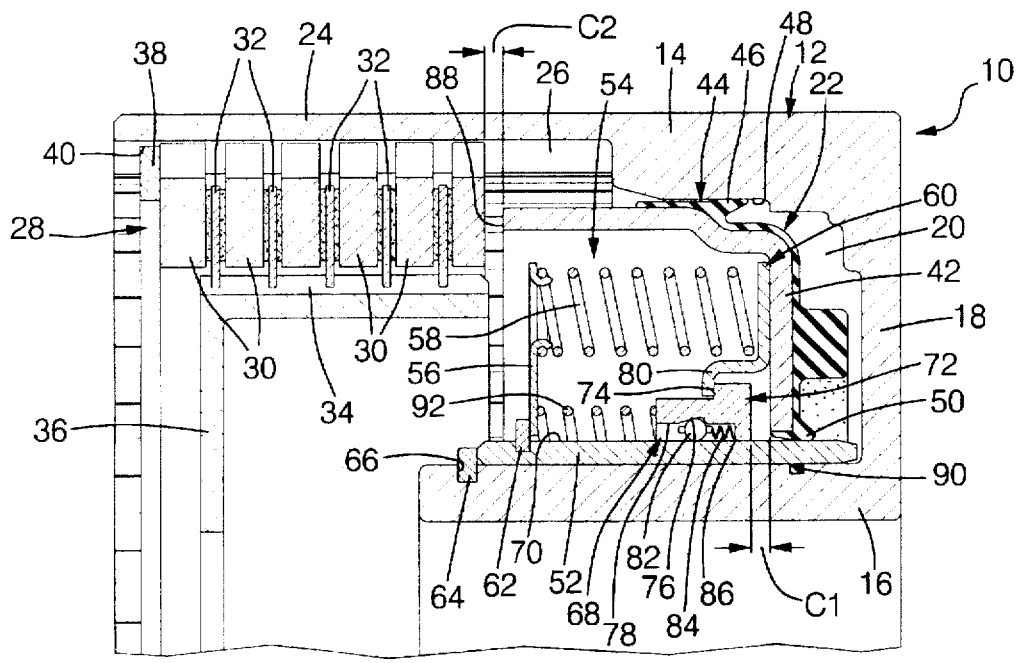
FIG. 1 is a sectional elevational view of a clutch assembly incorporating the present invention with the clutch depicted in the disengaged condition.
Figure 2:
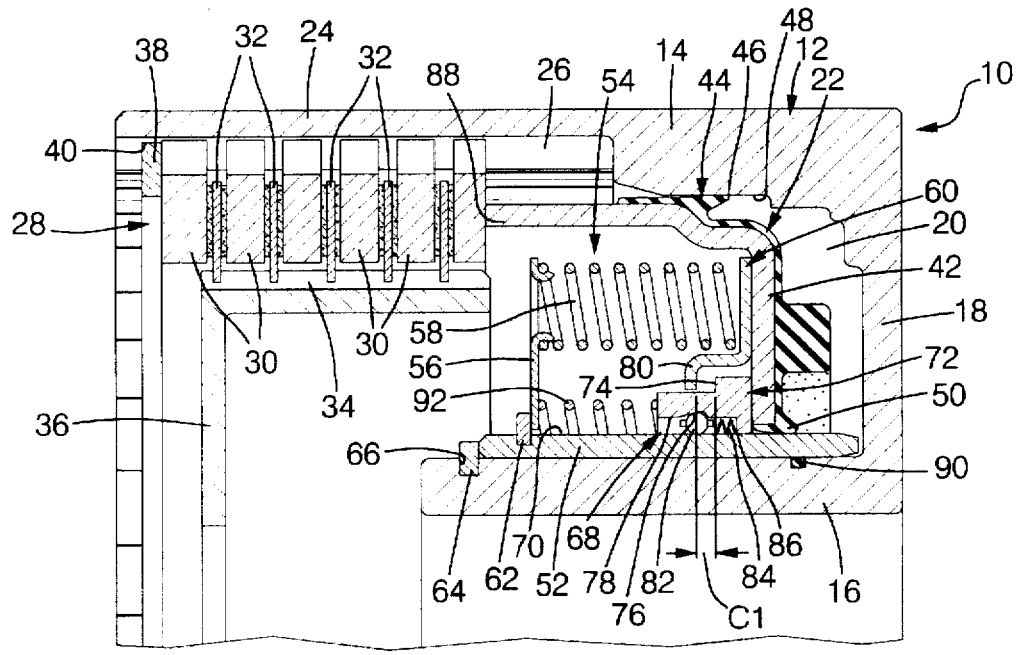
FIG. 2 is a view similar to FIG. 1 with the clutch depicted in the engaged condition.

Referring to the drawings, wherein like characters represent the same or corresponding parts throughout the several views, there is seen in FIGS. 1 and 2 a clutch assembly 10 having an annular housing 12 which includes an outer hub portion 14 and an inner hub portion 16. The inner hub 16 and outer hub 14 are connected with an annular wall 18. The hub portions 14 and 16 and the annular wall 18 cooperate to form a fluid cavity 20.

Slidably disposed in the fluid cavity is a piston assembly 22. The outer hub portion 14 has a drive extension portion 24 in which is formed a spline or drive teeth 26. A friction clutch pack 28 is disposed within the housing 12 adjacent the piston assembly 22. The clutch pack 28 incorporates a plurality of clutch plates or discs 30 and a plurality or friction plates or discs 32. The clutch plates 30 are drivingly connected with the spline teeth 26 and the friction plates 32 are drivingly connected with spline teeth 34 which are formed on a hub member 36. The clutch pack 28 is restrained in movement leftward, as seen in FIG. 1, by an annular locking ring 38 which is secured in a groove 40 formed in the housing 12.

The piston assembly 22 includes an annular piston 42 having a seal portion 44 including an outer lip 46 which slidably sealingly engages a wall 48 of the cavity 20 and an inner lip 50 which sealingly engages a sleeve 52 which is a member of the piston assembly 22. The piston assembly 22 further includes a return spring assembly 54 incorporating a retainer 56 and a plurality of helical coil return springs 58. The springs 58 are secured to the retainer 56. The return spring assembly 54 also has a reaction plate 60 which is forced into abutment with the piston 42 by the return springs 58. Thus, the piston 42 is urged rightwardly as seen in FIG. 1.

Leftward movement of the retainer 56 is prevented by an annular locking ring 62 secured in the sleeve 52. The sleeve 52 is secured in the cavity 20 by an annular locking ring 64 which is secured in a groove 66 formed in the inner hub 16.

A one-way mechanism 68 is disposed on the sleeve 52. The sleeve 52 has an outer surface 70 which provides an inner race for the one-way mechanism 68. The one-way mechanism 68 further comprises a body 72 having formed thereon a shoulder 74 and a cam surface 76. The cam surface 76 is formed in an inner race 78 of the body 72. The shoulder 74 is annular and aligned for contact, as seen in FIG. 1, with an extension 80 of the reaction plate 60. The one-way mechanism 68 further includes a plurality of spheres 82 which are disposed equiangularly about the sleeve 52. The number of spheres 82 may vary upwards of three.

The spheres 82 are urged leftward, as viewed in FIGS. 1 and 2, by springs 84 which are compressed between a shoulder 86 formed on the body 72 and the spheres 82. The cam 76 is formed such that on leftward movement of the body 72 sufficient space is provided to permit the spheres 82 to roll freely along the sleeve 52. However, rightward movement of the body 72 is prevented by the reaction between the cam surface 76, the spheres 82 and the sleeve 52. Thus, the one-way mechanism 68 will move leftward freely but will prevent rightward movement.

As seen in FIG. 1, the piston 42 is spaced from the body 72 by a distance or clearance C1. At initial assembly, the distance C1 is equal to or less than a distance or clearance C2 which defines the distance between an engaging face 88 of the piston 22 and the one of the clutch plates 30. The distance C2 is the initial free running clearance of the friction pack 28.

As seen in FIG. 2, the piston 42, during engagement of the clutch assembly 10, has moved through the distance C1 to enforce contact between the face 88 and the clutch plate 30. The reaction plate 60 also moved simultaneously with the piston 42 until it is separated from the shoulder 74 by an amount equal to distance C1. The piston after traveling through the distance C1 has engaged the body 72 of the one-way device mechanism 68. If the distance or clearance C2 is larger than the distance C1, the piston 42 and one-way mechanism 68 continue to move leftward under the action of fluid pressure in the cavity 20 until the clearance C2 is fully consumed and the clutch pack 28 is fully engaged thereby transmit torque between the housing 12 and the hub 36. At this point, the clearance between the reaction plate 60 and the shoulder 74 will be equal to the distance C1 and the clutch will be fully engaged. When the pressure in cavity 20 is released, the return springs 58 will force the reaction plate 60 and piston 42 rightwardly within the cavity 20 until the extension 80 of the reaction plate 60 is in abutment with the shoulder 74 of the body 72. At this position, as shown in FIG. 1, the rightward movement of the piston 42 will be halted and the clearance C2 between the piston 42 and the clutch plate 30 will be equal to the clearance C1 between the piston 42 and the body 72 of the one-way mechanism 68.

Further engagements and releases of the clutch assembly 10 will be limited to this clearance of C1. Should the clutch plates or friction plates undergo some slight amount of wear in the life of the transmission, the extra clearance space will be taken up by leftward movement of the body 72 during clutch engagement. However, upon disengagement, the clearance C1 will be reset within the transmission assembly.

Figure 3:
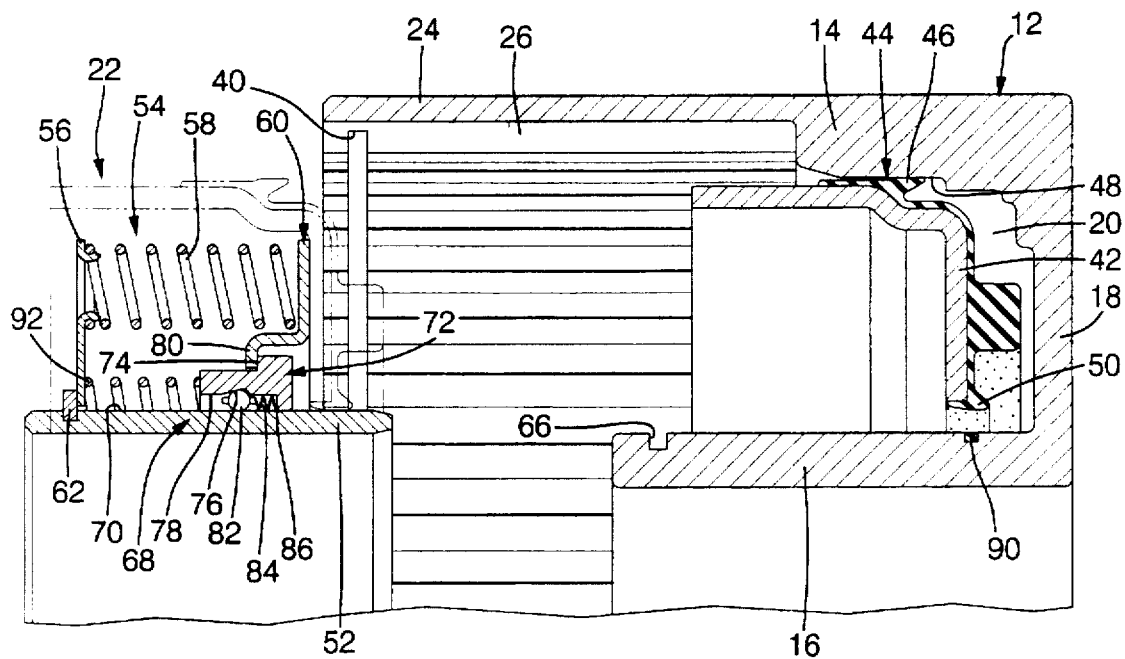
FIG. 3 is a view depicting the partial assembly of the clutch shown in FIG. 1.
Figure 4:
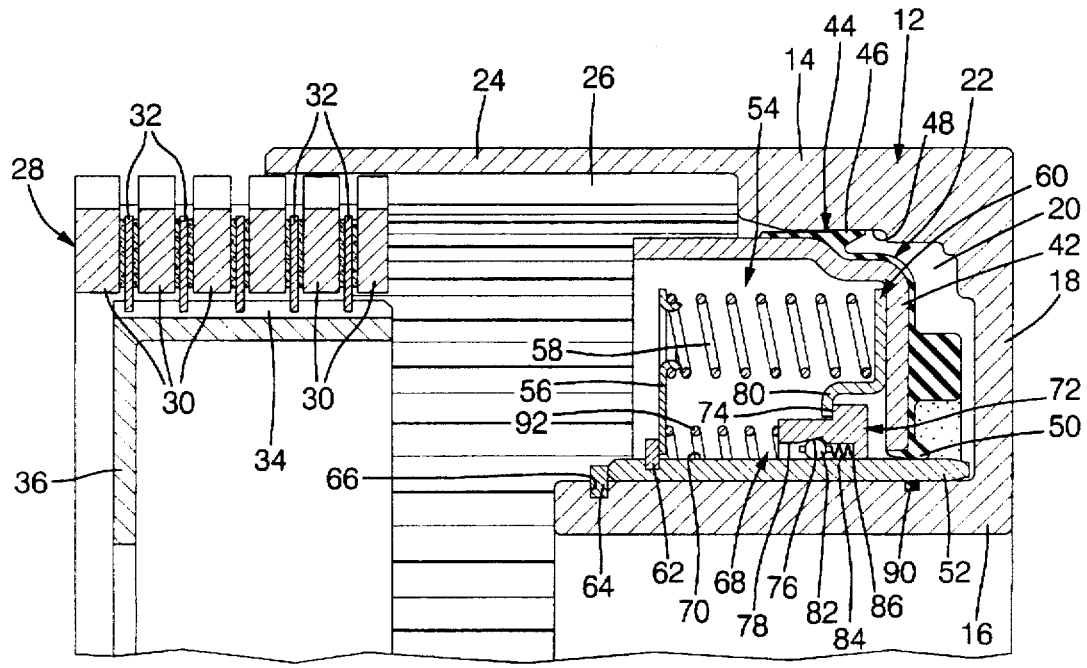
FIG. 4 is a view depicting the partial assembly of the clutch shown in FIG. 1.

The assembly of the clutch is shown in FIGS. 3 and 4. As seen in FIG. 3, the piston 42 is assembled within the housing 12. The return spring assembly 54, including sleeve 52 and the one-way mechanism 68, are then assembled in the housing 12 by mounting the sleeve 52 on the inner hub 16. After the assembly 54 is installed, the locking ring 64 is inserted into the groove 66 such that the piston assembly 22 is then completed within the housing 12. Following this assembly, the clutch pack 28 is then installed within the housing 12, as shown in FIG. 4. Following installation of the clutch pack 28, the locking ring 38 is secured within the groove 40 resulting in a completed clutch assembly, as shown in FIGS. 1 and 2.

The sleeve 52 is slidably disposed on an annular O-ring seal 90 to prevent fluid within the cavity 20 from leaking along the inner hub 16 to atmosphere. Thus, the fluid tight integrity of the cavity 20 is maintained.

In the alternative, the piston 42 can, if desired, be mounted in the sleeve 52 and the entire piston assembly 22 can then be placed in the housing 12. However, it has been found preferable to mount the piston 42 within the housing 12 prior to the installation of the return spring assembly 54 into the housing 12. The one-way mechanism 68 is positioned on the sleeve 52 and, as seen in FIG. 3, has imposed thereon forces from both the return springs 58 and a cam reaction spring 92. Thus, the original positioning of the one-way mechanism 68 is performed outside of the clutch assembly 10. However, after the initial pressurization of the cavity 20, all of the clearances within the clutch assembly will be equal. That is, the clearance between the piston 42 and the body 72, between the body 72 and the reaction plate 60 and between the piston 42 and the clutch plate 30.

It should also be appreciated that while the above invention was described in a clutch assembly, the same structure could be utilized in a disc brake assembly or a band brake assembly. Such brakes assemblies are utilized in power transmissions. In band brake assemblies, the servo motor includes a piston and housing such that the one-way device can be disposed between the piston and the inner surface of the housing or a sleeve secured therein.

Obviously, many modifications and variations of the present invention are possible in light of the above teaching. It is therefore to be understood, that within the scope of the appended claims, the invention may be practiced otherwise than as specifically described.

What is claimed is:

1. A fluid operated selectively engageable friction assembly comprising:

a housing having an annular cavity defined therein;

an annular apply piston slidably disposed in said cavity; and a one-way mechanism defined by a plurality of spheres disposed between a wall of said cavity and the apply piston for permitting free sliding movement of the apply piston in an engaging direction and limiting the movement of the apply piston in a disengaging direction to a predetermined amount.

2. The invention defined in claim 1, wherein the one-way mechanism includes a body portion disposed a fixed distance from the apply piston, a reaction plate is maintained in engagement with the apply piston and is also in engagement with the body portion when the friction device is disengaged and said reaction plate is separated from the body portion by said fixed distance when the friction device is engaged and said apply piston engages said body portion.

3. The invention defined in claim 1, wherein a sleeve member is disposed on said cavity wall radially inward of and engaging said spheres.

4. The invention defined in claim 1, wherein a plurality of disc members are disposed in said cavity for engagement enforced by said apply piston and wherein said disc members have a free running clearance equal to said predetermined amount.

* * * * *